Patented Aug. 26, 1924.

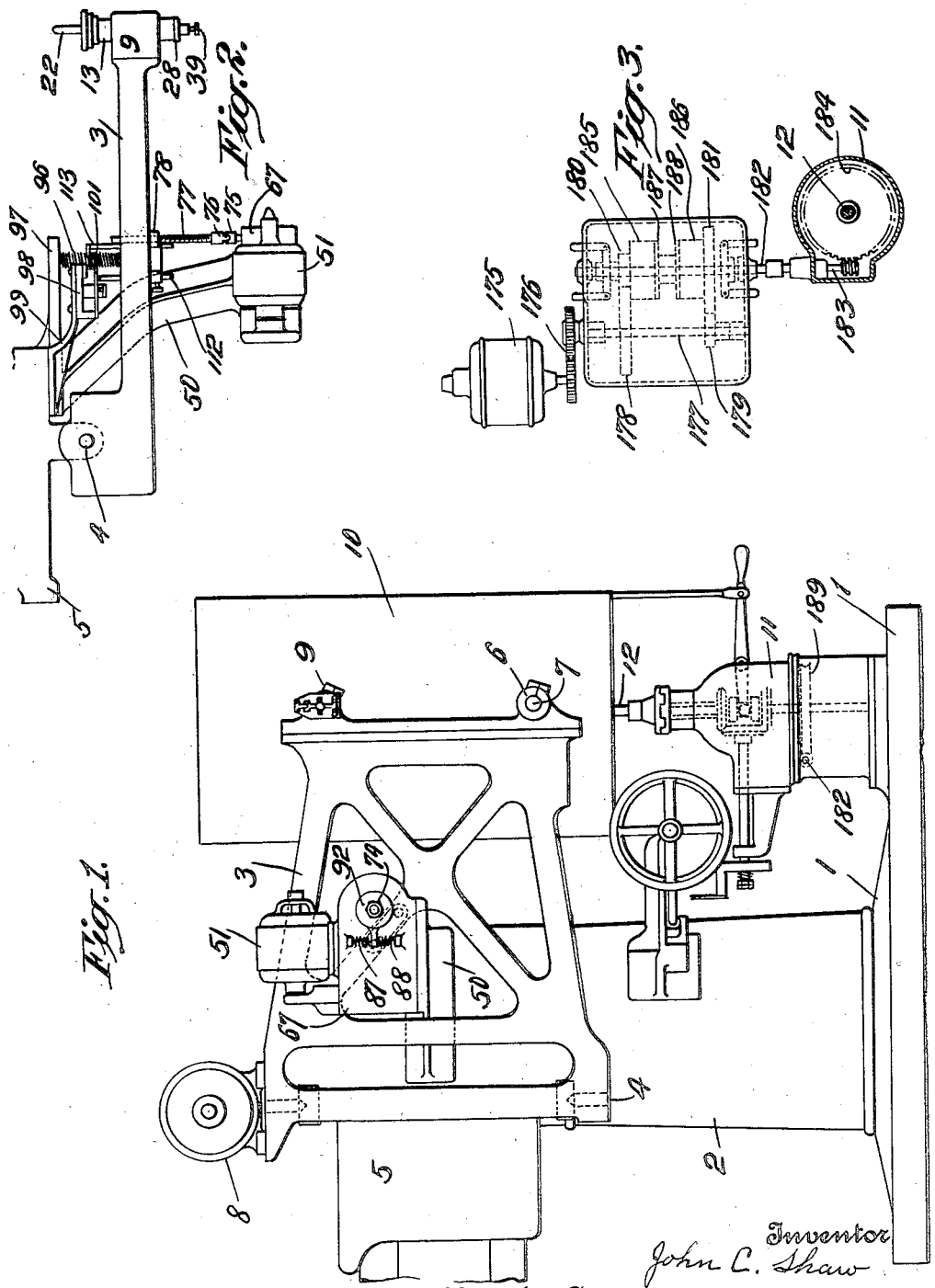

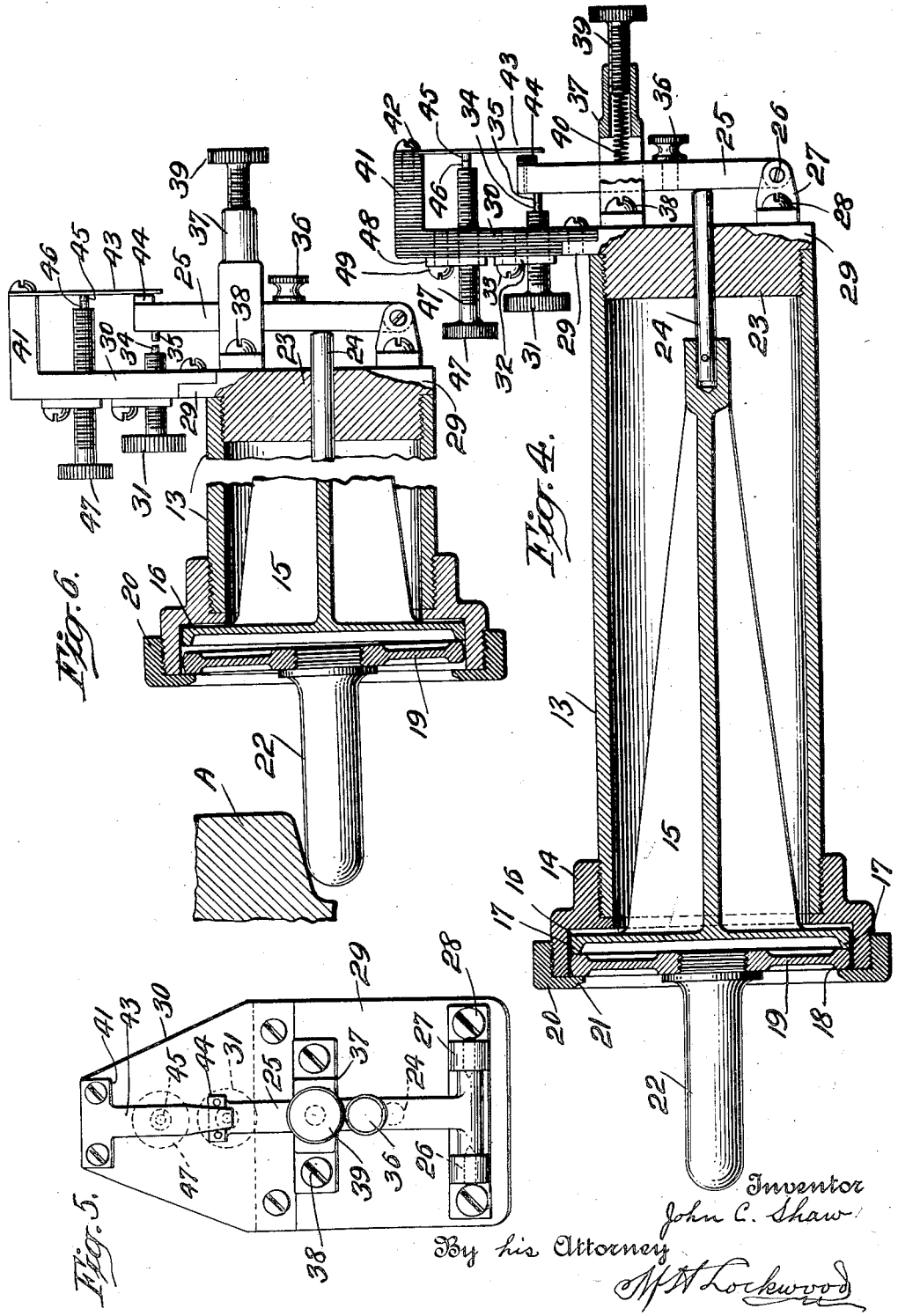

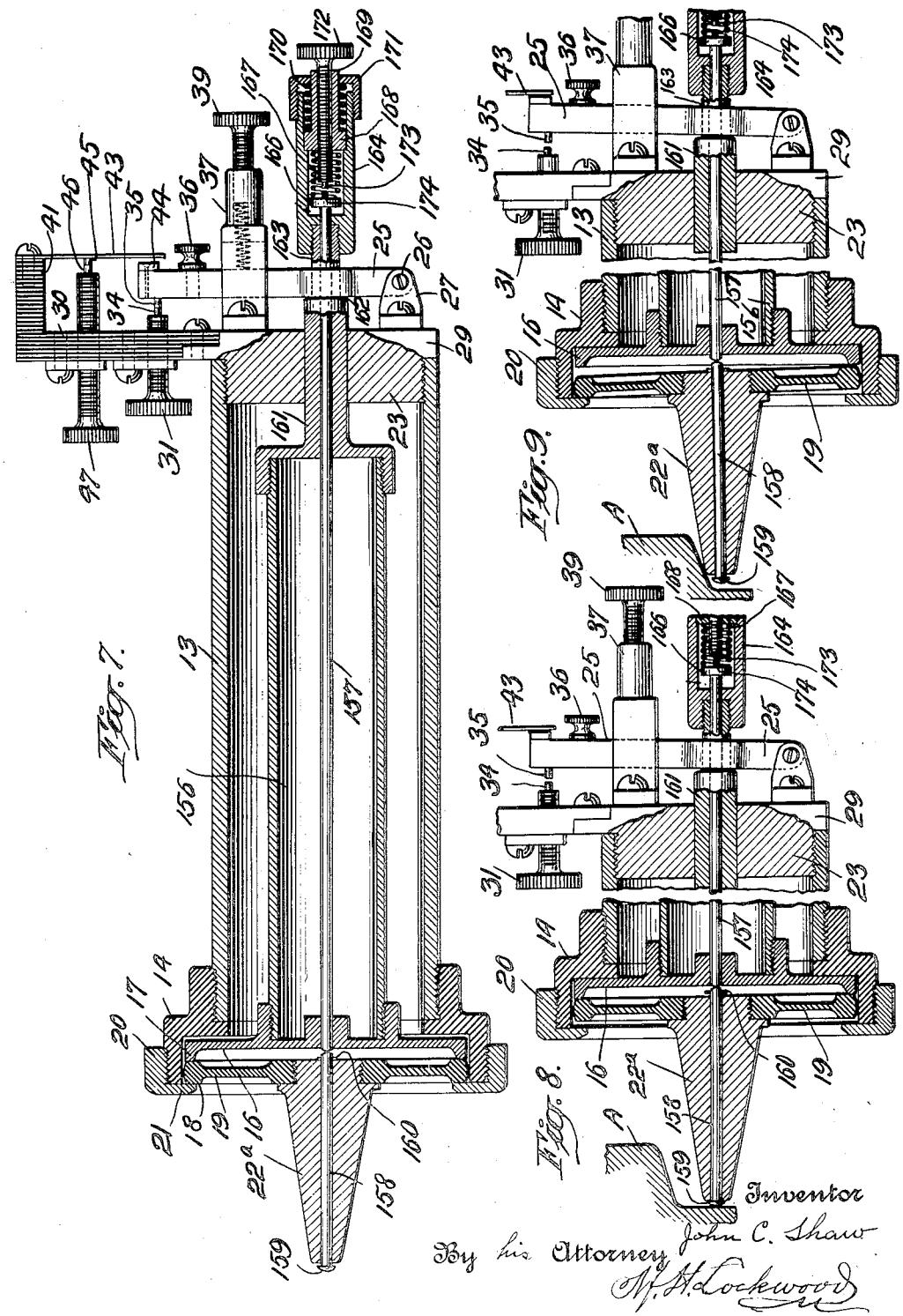

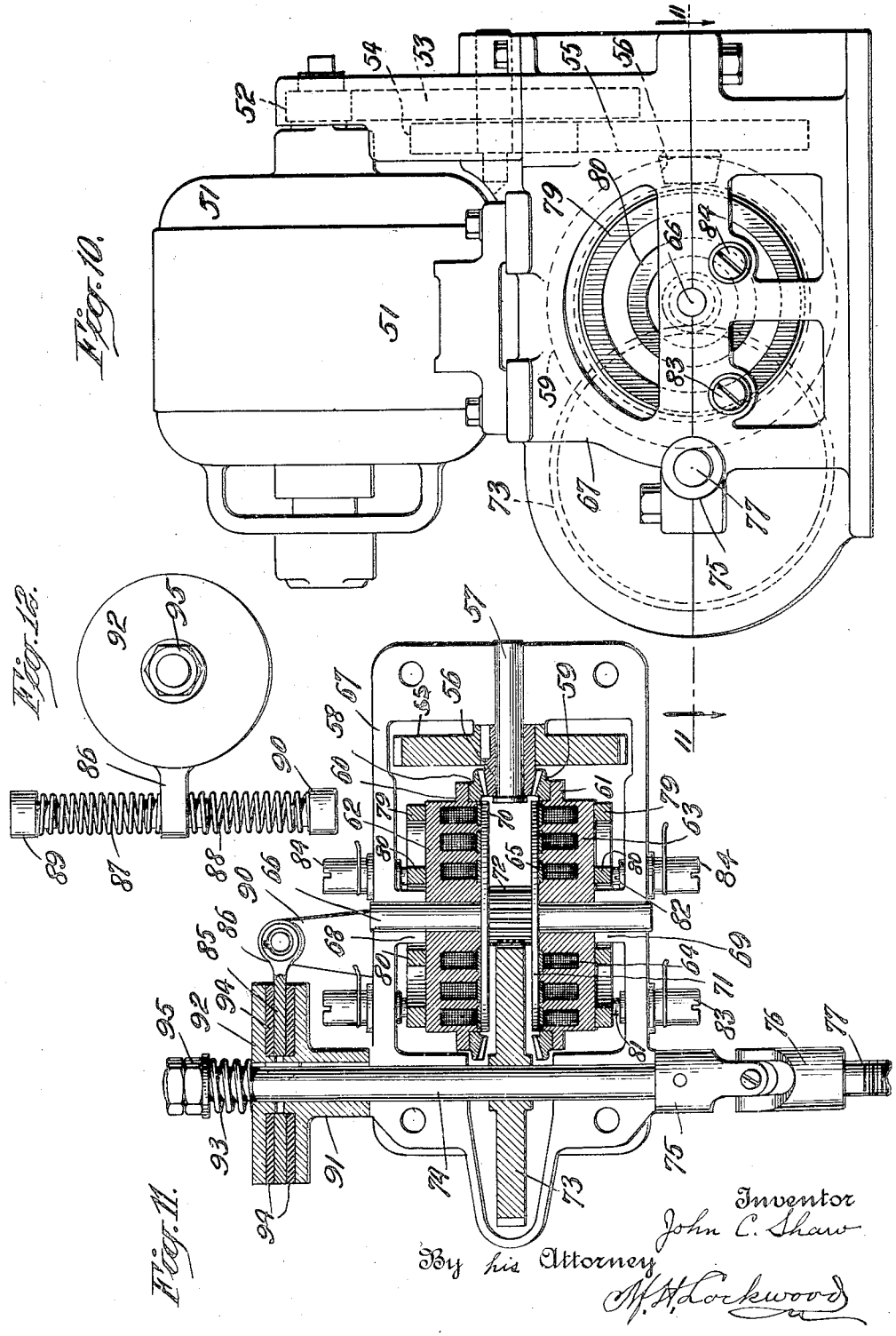

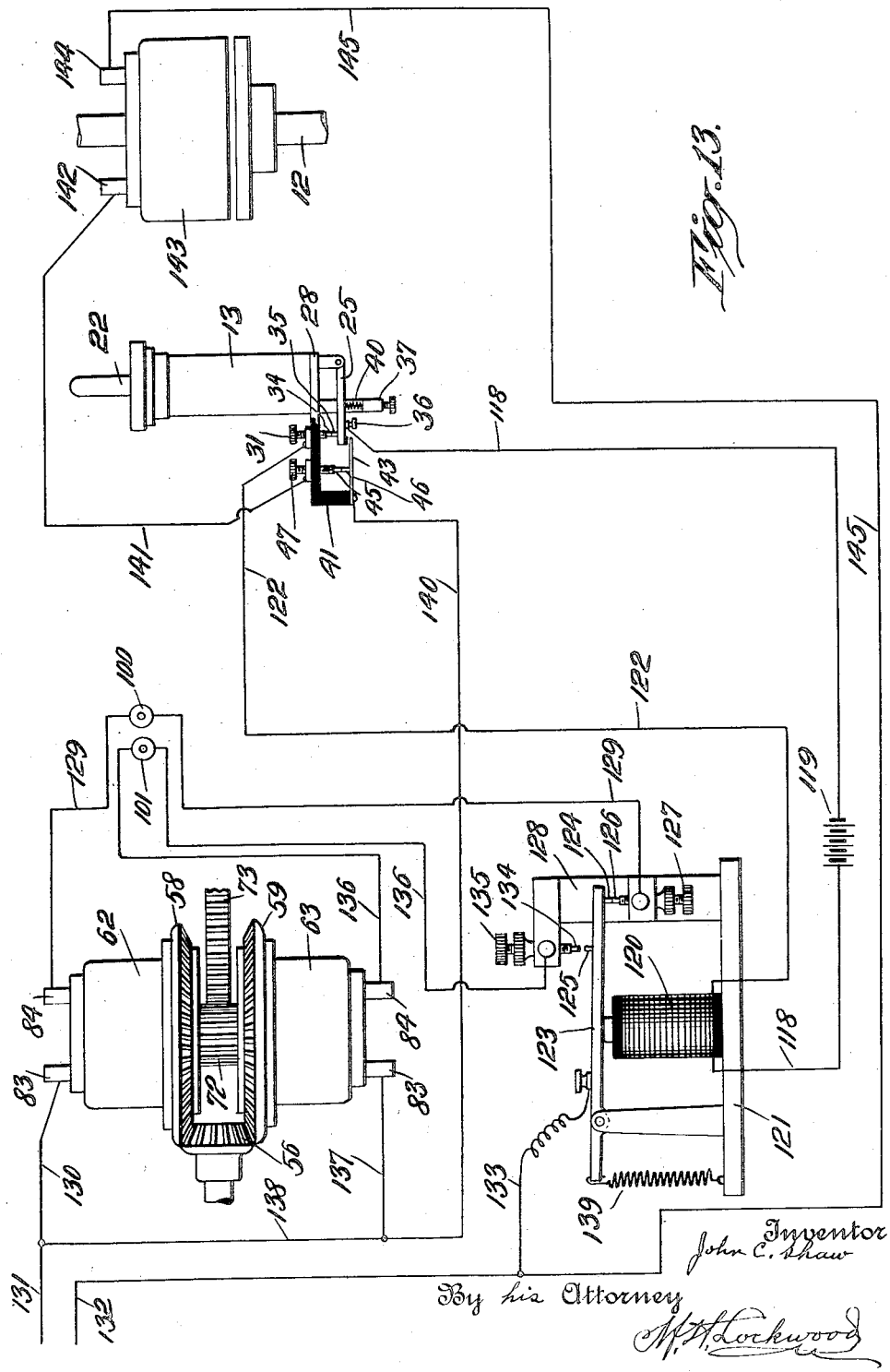

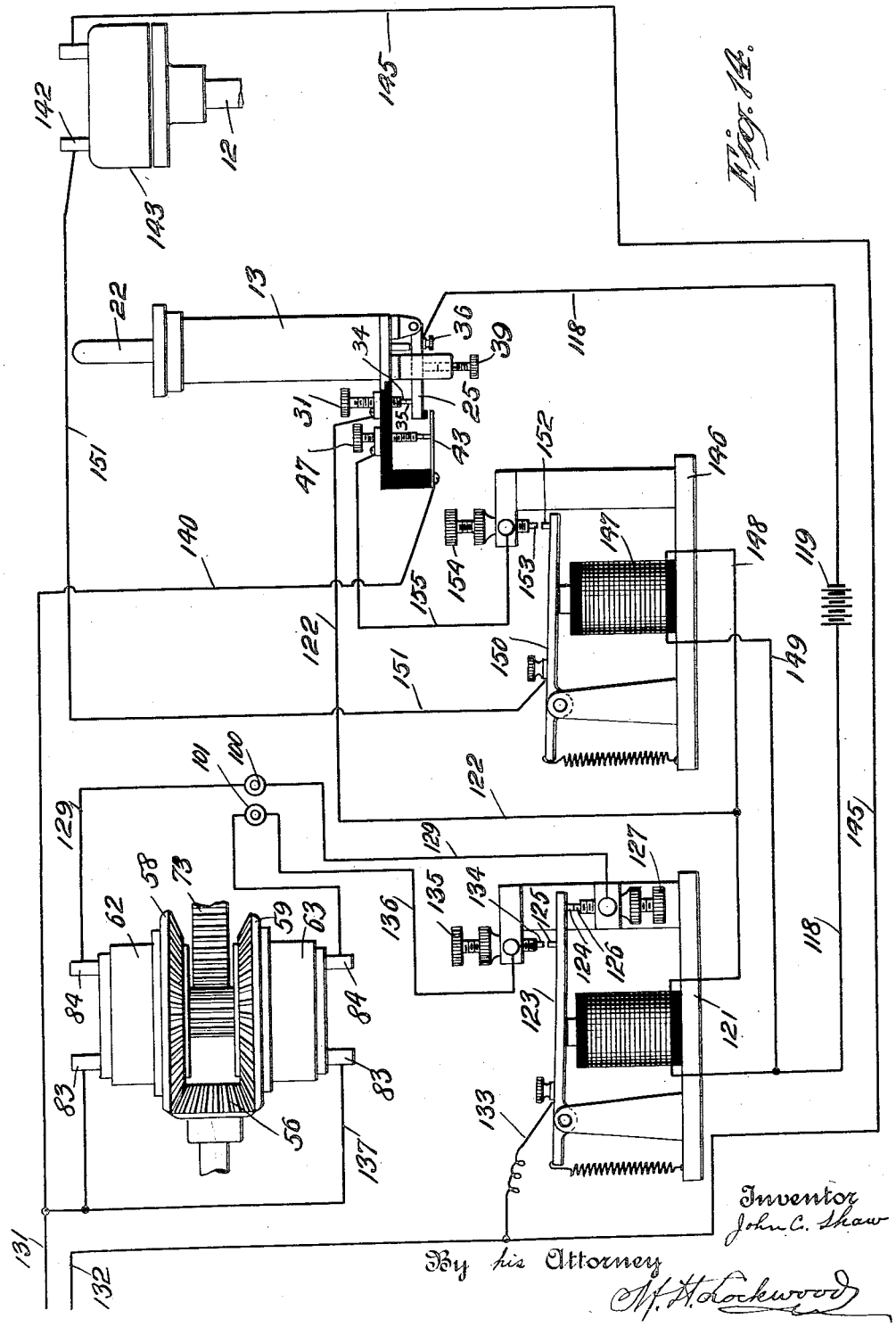

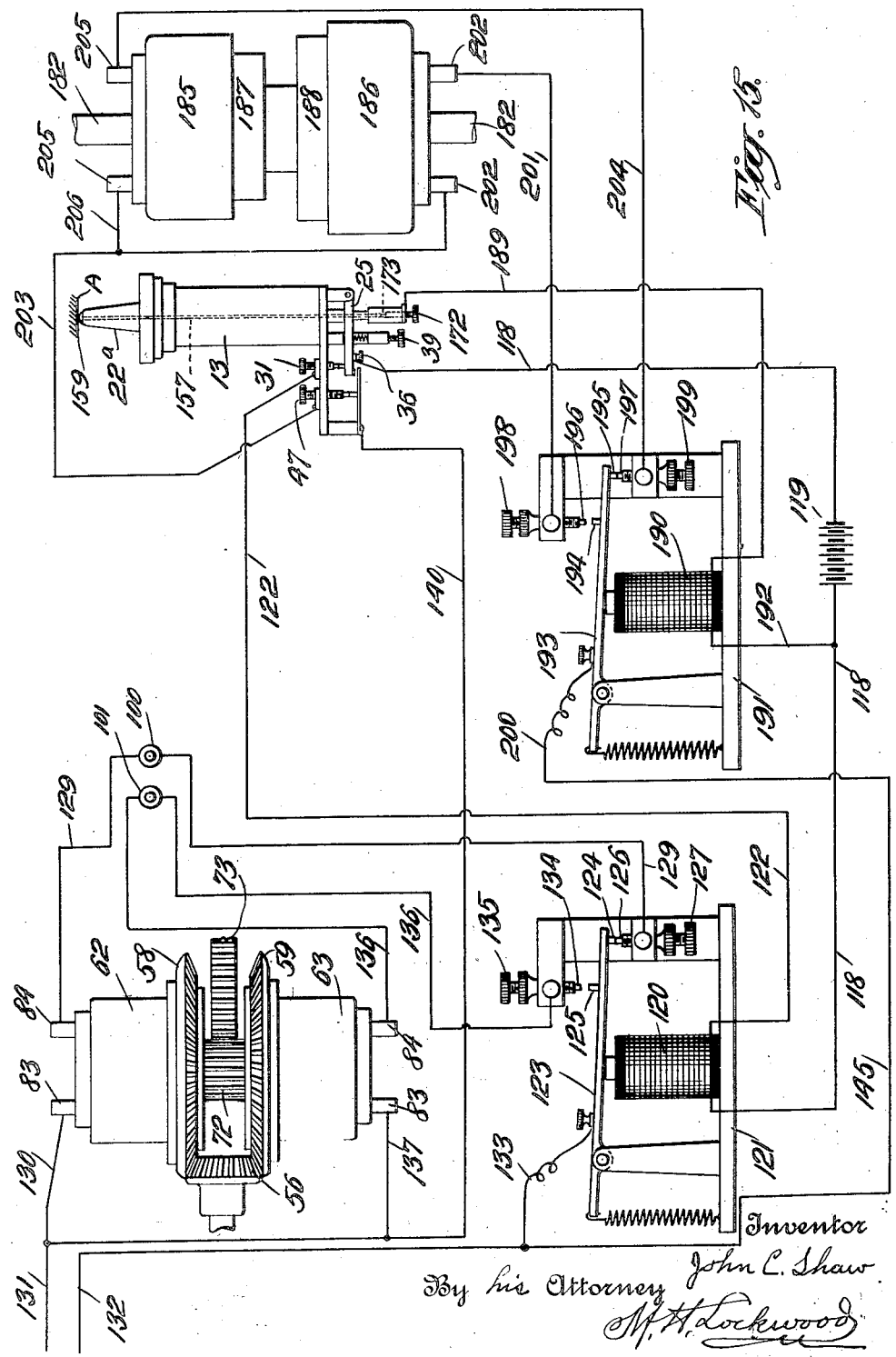

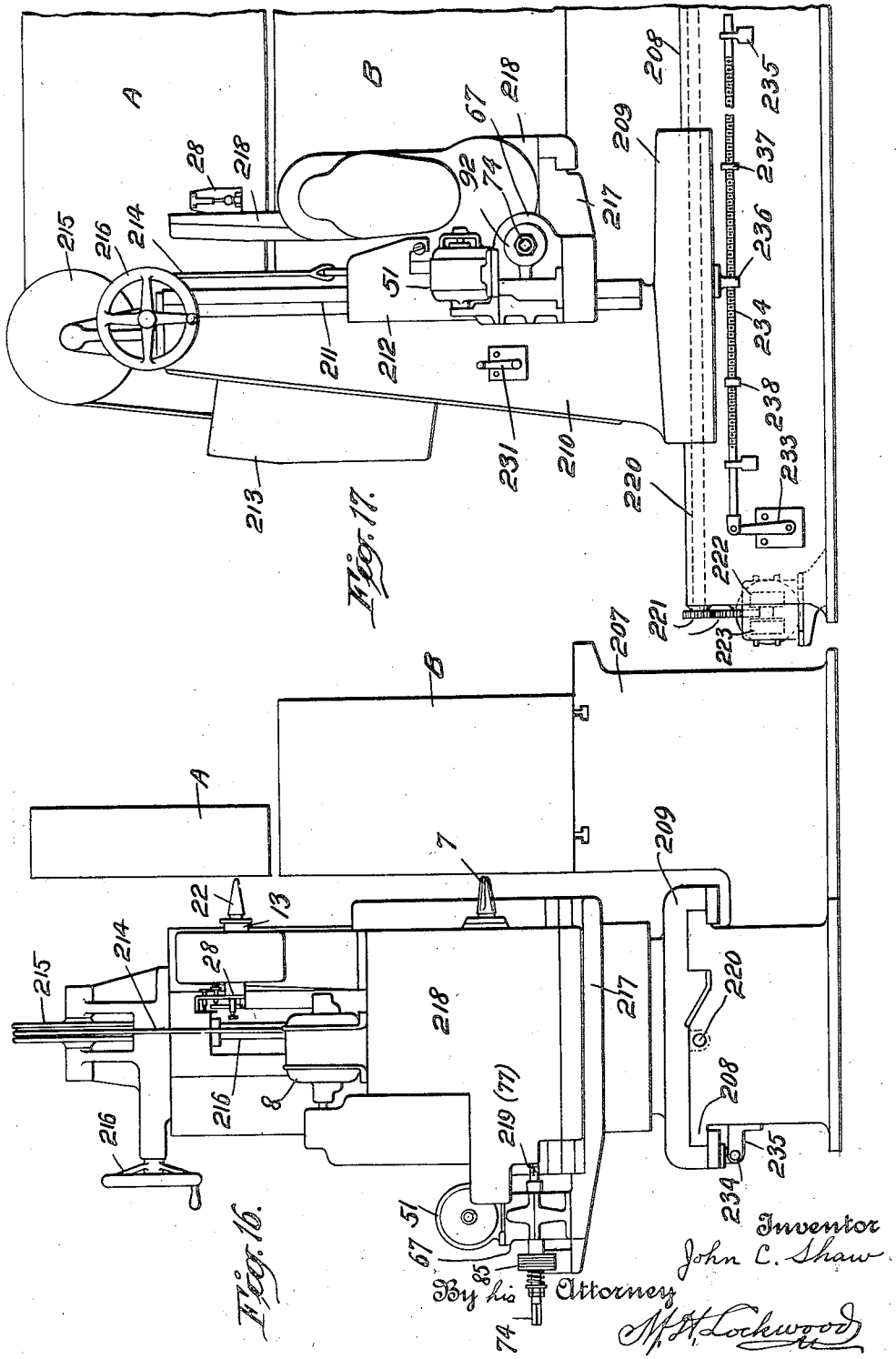

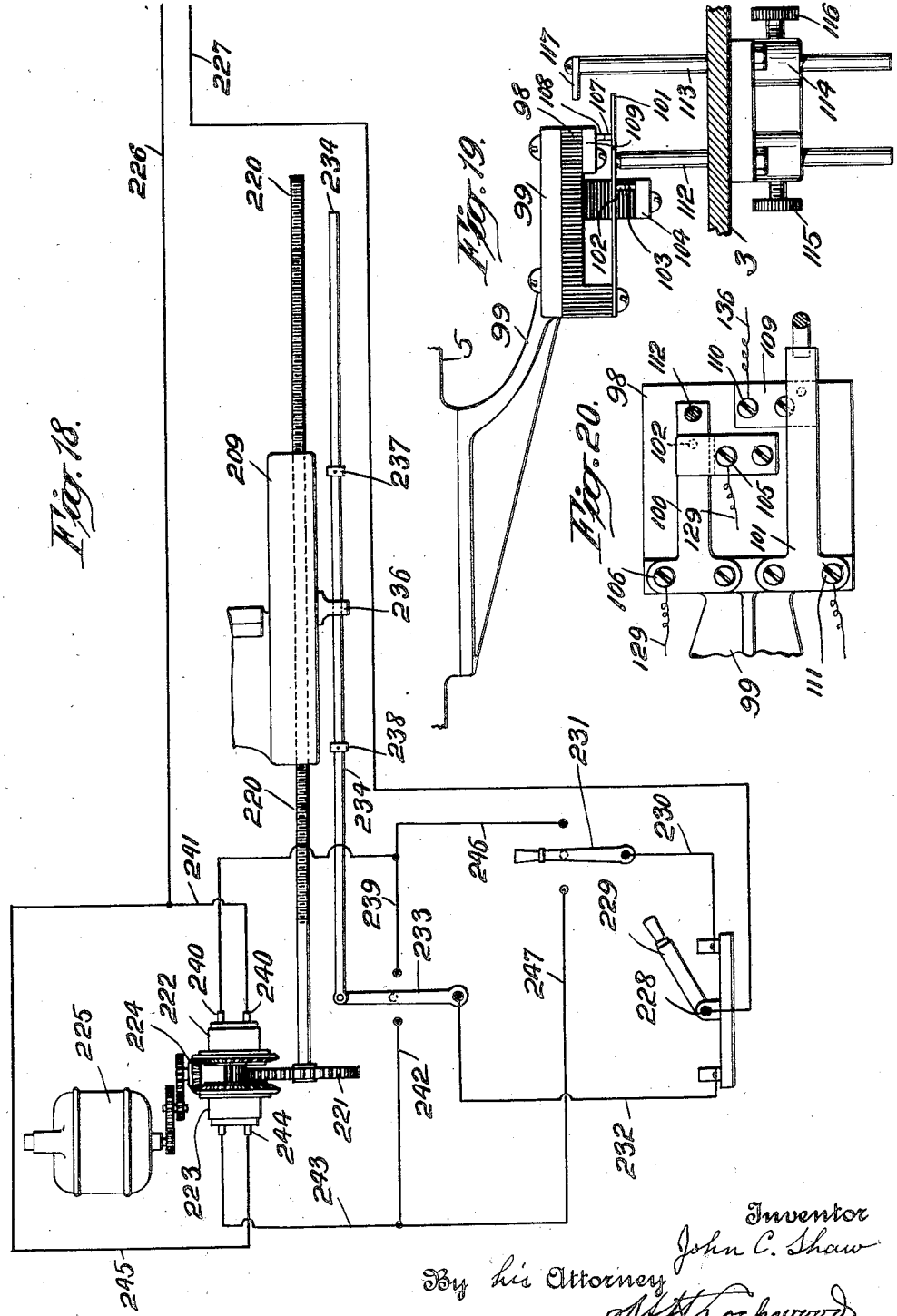

1,506,454

UNITED STATES PATENT OFFICE.

JOHN C. SHAW, OF BROOKLYN, NEW YORK, ASSIGNOR TO KELLER MECHANICAL ENGINEERING CORPORATION, OF BROOKLYN, NEW YORK, A CORPORATION OF NEW YORK.

TRACER CONTROL FOR DIESINKING MACHINES.

Application filed February 6, 1920. Serial No. 356,766.

*To all whom it may concern:*

Be it known that I, JOHN C. SHAW, a citizen of the United States, and resident of Brooklyn, county of Kings, and State of New York, have invented certain new and useful Improvements in Tracer Controls for Diesinking Machines, of which the following is a specification.

My invention relates more particularly to a die sinking machine in which a tracer and cutter are mounted upon a movable member for movement toward and from the pattern and die, respectively, whereby as the tracer follows the pattern, the cutter will cut the die to correspond with the pattern. In machines of this character as ordinarily constructed, an arm or bar is pivotally mounted and adapted to support the tracer and cutter in position to cooperate with the pattern and die which are mounted upon a reciprocating table for movement transversely of the tracer and cutter. The bar supporting the tracer and cutter is also mounted upon a slide so that it may be given a feed movement in a transverse direction at right angles to the direction of movement of the reciprocating table. In this manner, it is possible for the tracer to cover the entire surface of the pattern to be reproduced, and the cutter will reproduce it in the die.

In prior machines of this type, the tracer has been held to follow the contour of the pattern by pressure exerted through an adjustable weight operating over suitable pulleys, and this pressure was all the pressure available on the cutter and hence the amount of material removed by the cutter in a given time was limited. In order to apply as much pressure as possible to the cutter, it has been necessary to make the pattern of a hard substance capable of standing a considerable amount of pressure but on account of the expense of such patterns, more delicate patterns are frequently used, although much more time is required in reproducing the pattern in the die. Because of the convenience and cheapness of producing patterns in plaster of Paris or similar material, patterns of this material are preferable to those made out of metal or harder material.

The object of my improved tracer control is to permit the use of delicate patterns formed of plaster of Paris or other soft material of sufficient strength to withstand light pressure and to provide means, including magnetic clutches and screw feed, for positively feeding the cutter toward and from the die, so that as the tracer follows the pattern the cutter will be positively held to make the cut in the die and in this manner deeper and heavier cuts are possible and hence the time required for making the die is very considerably reduced.

Another object of my improved tracer control is the employment of rotary magnetic clutches for controlling the feeding of the tracer and cutter toward and from the pattern and die and also to control the relative transverse feed of the pattern and die with respect to the tracer and cutter. With my improved control it is possible to vary the connections of feeding control to a considerable extent according to the character of the work to be done, and in this manner protect the cutter from excessive strain, particularly when operating to reproduce an irregularly shaped pattern, the contour of which includes sharp angles and alternate deep and shallow elements.

I am aware that electrical contact tracers have been employed in which the conductivity of the pattern is utilized to complete the circuit through the tracer point, but obviously this method is not suitable for a wide range of adaptation and does not solve the problem of utilizing patterns made of cheap material like plaster of Paris, nor do they solve the problem of positive feed for the cutter so as to facilitate high speed operation. With my improved tracer, the tracer point is mounted for slight universal movement with reference to the support and by this movement the tracer point is adapted to open and close contact points in circuit with a relay which in turn, is adapted to control a pair of magnetic clutches included in the feeding mechanism for positively feeding the tracer and cutter toward and from the pattern and die respectively. A suitable spring is adapted to hold the tracer point in normal position and restore it thereto when displaced and the arrangement of the electrical connections between the tracer point contacts and the magnetic clutches is such that when the tracer point is in normal position the clutch for feeding the tracer and cutter toward the pattern and die is energized. When the tracer point by contact with the pattern is moved inward or angularly with respect to its axis the relay contacts will be opened and the relay will reverse the feed by energizing the other clutch so that the feed of the tracer and cutter will be away from the pattern and die. By this method I have found it possible to make the tracer point extremely sensitive thereby controlling the position of the tracer within close limits so that it will accurately follow the pattern, while the positive screw feed absolutely compels the cutter to follow the movements of the tracer.

Preferably, I may also provide a magnetic clutch in the feed for the table and provide electrical connections and contacts between the movable tracer point for cutting out the table feed when the tracer point is moved an excess amount such as might happen in trying to ride over a sharp angle or a quick rise in the pattern. In this manner the cutter and the work are protected from serious damage.

I have also provided for a dual-point tracer adapted to control magnetic clutches in connection with the transverse or table feed for giving one or another of two speeds thereto. Obviously, various combinations of control may be worked out with the forms of tracer points described, and I have shown diagrammatically several variations in the connections between the tracer control and the magnetic clutches. It will be obvious also to those skilled in the art that a movable tracer point of this character may be adapted for controlling other than magnetic clutches such as those operated by fluid pressure in any suitable or preferred manner.

In the accompanying drawings I am illustrating my invention by showing various adaptations of my tracer magnetic control in combination with two types of die sinking machines. Fig. 1 represents the ordinary bar type of die cutting machine with my improved tracer control and magnetic clutch feed; Fig. 2 represents a plan view of the bar of the die sinking machine of Fig. 1, and the bracket attached to the slide therefor for supporting the magnetic clutch feed mechanism; Fig. 3 represents a plan view of one form of the transverse or table feed mechanism including the two speed, magnetic clutch control; Fig. 4 represents a vertical longitudinal section of my improved single point tracer and the control contacts; Fig. 5 is a rear-end elevation of the tracer showing the tracer control contact members; Fig. 6 is a fragmentary view of the tracer shown in Fig. 4 showing movement of the tracer point and the results of such movement; Fig. 7 is a vertical longitudinal section of my dual-point tracer for the two-speed control; Fig. 8 is a fragmentary view of the dual-point tracer showing the operation of the tracer points on a flat surface or as it would operate on portions of a pattern where the angle does not exceed 45°; Fig. 9 is a fragmentary view showing the operation of the dual-point tracer on a portion of the pattern where the angle exceeds 45°; Fig. 10 is a side elevation of the motor and the magnetic clutch control for operating the positive screw feed of the tracer and cutter in axial directions; Fig. 11 represents a transverse section on line 11—11 of Fig. 10 showing the construction and arrangement of the magnetic clutch control mechanism; Fig. 12 is a detail of the friction discs on the end of the feed screw shaft of Fig. 11; Fig. 13 shows diagrammatically, the electrical connections between the single point tracer and the feed controlling magnetic clutches; Fig. 14 represents, diagrammatically, the electrical connections between the single-point tracer control and the magnetic clutches for controlling both the to-and-from feed and the transverse feed. Fig. 15 represents diagrammatically, the electrical connections between the dual-point tracer control and the magnetic clutches for axial feed of the tracer and cutter as well as the clutches controlling the two-speed transverse feed; Fig. 16 shows a side elevation of my improved die cutting machine in which a reciprocating slide, or carriage is provided for supporting the tracer and cutter, the same being positively fed and controlled by my improved tracer and magnetic control clutches; Fig. 17 is a front elevation of the machine of Fig. 16 (partially broken away) showing the magnetic control clutch for the transverse feed; Fig. 18 shows, diagrammatically, the electrical connections for the magnetic control clutches for the transverse feed of the machine shown in Figs. 16 and 17; Fig. 19 is a detail plan view of the safety limiting switches for limiting the axial feed of the tracer and cutter in both directions and Fig. 20 is a plan view of the supporting plate for the limiting switches of Fig. 19.

*Bar machine.*—Referring to the drawings, Fig. 1 represents the usual swinging bar type of die sinking machine to which my improvement may be applied. In some of the drawings, parts of the machine are omitted in order to avoid complicating the drawings, and only the essential parts of the machine are represented in that the construction and mode of operation of these machines are well-known, for machines of this type have been in use for years. The machine represented is mounted upon a base 1 provided with a pillar 2 upon which the tracer and cutter bar 3 is supported. The bar 3 is pivotally mounted at 4 (see Fig. 2) upon a slide member 5 to permit adjustment of the bar and hence of the tracer and cutter in a horizontal direction. The outer or free end of the bar is provided with a bearing at 6 in which the cutter 7 is mounted for rotation. A motor 8 is preferably mounted on the upper portion of the bar, as indicated in Fig. 1 of the drawings and the usual pulley and belt connections are employed for rotating the cutter 7 by means of the motor 8. To void confusion these belt connections are not shown in the drawings. Vertically above the cutter 7 my improved tracer is preferably mounted in a suitable yoke 9 on the bar 3, the axes of the cutter and tracer being located in the same vertical plane.

A vertically reciprocating table 10 is mounted for supporting and moving the pattern and die in cooperative relation with the tracer and cutter respectively, this feature being a well-known construction for this type of machine. At the base of the machine, in the casing 11, the usual feed screw operating mechanism is mounted for operating the screw 12 to feed this reciprocating table 10 in both directions, vertically and parallel to a line between the tracer and cutter. It will thus be seen that the machine operates to move the tracer and cutter in vertical lines back and forth over the pattern and die respectively, the cross feed from line to line being accomplished by sliding the bracer and cutter bar slide member 5 in the usual manner.

Ordinarily, in this type of machine, the tracer and cutter are held in operative contact with the pattern and die by an arrangement of weights supported by a cord operating over pulleys and adapted to draw the bar 3 toward the table 10, the pressure of the tracer and cutter against the pattern and die being determined by varying the amount of weight. As heretofore used, the tracer has been provided with a fixed point, corresponding in size and shape with the cutter employed. The point being fixed in relation to its support and adapted to cooperate with the pattern, the latter was required to be made of material sufficiently strong to stand the pressure brought to bear thereupon by the weight operating to move the bar 3 toward the pattern and die. The weight referred to was connected to the bar by a cord passing over pulleys so that as the tracer followed the contour of the die the bar would be moved in and out by the pressure of the relatively fixed tracer point against the face of the pattern. This pressure from the weight was all that could be depended upon to hold or force the cutter into the die. For this reason the depth of cut and hence the speed of operation was limited by the amount of pressure the pattern was able to stand and also by the acuteness of the angular portions of the pattern over which it was necessary for the tracer point to travel.

*Single-point tracer control.*—To overcome these difficulties I have devised an improved form of tracer including a movable tracer point to electrically or otherwise control suitable clutches, associated with positive feeding means to feed the tracer and cutter positively both toward and from the pattern and die, respectively. One form of my improved tracer is represented in longitudinal section in Fig. 4 of the drawings. It will be seen that a body portion 13 is provided for supporting the tracer point and associated parts, said body portion in the present instance being shown as cylindrical, although any desired form as to cross-section may be employed. The forward end of said body portion 13 is preferably provided with a flanged cap 14 provided with an annular opening through which a slidable or movable member 15 is adapted to extend axially of said body portion. The member 15 is provided with a circular radial flange 16 provided with an annular bead at 17 adapted to cooperate with the beaded edge 18 of a circular disc 19, mounted in front of said flanged member and held in place by a cap 20 provided with an inwardly extending annular flange 21. The tracer point 22 is mounted centrally of the disc 19 so that its axis coincides with the axis of the slidable member 15. It will be noted that the outer beaded edge 18 of the disc is rounded so as to form a portion of a sphere, corresponding to an equatorial belt, thereby permitting universal movement of the disc 19 and tracer point 22, with relation to the body 13 of the tracer.

The opposite or rear end of the tracer body 13 is preferably closed by a plug 23, provided with a central hole through which a rod 24 extends, said rod being connected with and forming an extension of the flanged slide member 15. The outer end of the rod 24 which extends through the plug 23, is adapted to engage a contact member 25 pivoted at 26 to the bracket 27 secured by screws 28, as indicated in Fig. 4 of the drawings, to the outer face of the plug 23. The plug 23 is preferably integral with a supporting plate 29, the upper end of which is preferably extended by securing thereto the member 30 composed of insulating material. The plate 30 of insulating material is preferably provided with a contact screw 31 passing therethrough and adapted by means of a metal plate 32 and screw 33 to be connected with an electrical circuit hereinafter described. The contact point 34 of the screw 31 is adapted to cooperate with a contact point 35, secured at the upper end of the contact member 25, previously referred to as operated by movement of the tracer point 22. The electrical circuit through the contact members 34 and 35 will be completed by connecting a wire under the thumb screw 36 on the member 25, as indicated in the drawings. A yoke shaped bracket member 37 is secured by screws 38 to the face of the plate 29 and is provided with a threaded portion in which an adjusting screw 39 is mounted for adjusting the tension on the contact member 25 and also to hold the contact members 34 and 35 closed so as to complete the electrical circuit. It will be noted that the tension of the spring 40 is also utilized to move the flanged member 15 toward the tracer point and force the disc 19 against the flange 21 thereby holding the tracer point 22 in axial alignment with the body of the tracer. From this construction it will be seen that if the tracer point 22 is moved in an axial direction or angularly in any direction, the disc 19 will press upon the flanged head 17 of the member 15 to thrust the latter rearward and move the contact member 25 against the opposition of the spring 40 to break the circuit by separating the contact points 34 and 35 as indicated in Fig. 6 of the drawings. The movement of the tracer point 22 will be affected by contact of the tracer point with the pattern A as indicated in Fig. 6 of the drawings. In this view it will be seen that the tracer point 22 is represented as striking a high portion of the pattern thereby causing it to move laterally, or angularly with respect to its axis and rock the disc to move the member 15. It will be understood, however, that by contact with a flat surface of the pattern, the disc 19 will be moved directly back, in an axial direction and similarly operate the member 15 which in turn operates the contact member 25.

The insulating portion 30 of the rear face plate mounted on the tracer is preferably provided with an L-extension 41 to which is secured, by the screw 42, a contact carrying member 43, the lower end of which is adapted to cooperate with and be engaged by the upper end of the member 25, which is preferably provided with an insulated lug 44. The member 43 is provided with a contact point 45 cooperating with a contact 46 mounted on the end of the adjusting screw 47, the latter passing through the plate 30 is adapted to complete electrical connections through the metal plate 48 and screw 49 with the circuit controlling a magnetic clutch in the feeding mechanism for feeding the table 10 vertically past the tracer and cutter as will be more fully pointed out hereinafter.

*Magnetic clutch control.*—The contact member 25 is adapted to control a pair of magnetic clutches cooperating with gear mechanism and a feed screw for positively feeding the bar 3, together with the tracer and cutter, toward and from the pattern and die. One form of my clutch control feeding mechanism is more particularly shown in Figs. 10—12 of the drawings and shown mounted in Figs. 1 and 2 on a bracket 50 secured to the slide member 5 and movable therewith. A motor 51 is preferably provided for operating the feed, the motor being connected by intermediate pinion and gear connections 52, 53, 54 and 55, (shown in dotted lines in Fig. 10) with a bevel pinion 56 mounted on a stud shaft 57 and adapted to cooperate with a pair of bevel gears 58 and 59, so that they are rotated in opposite directions. The bevel gears 58 and 59 are preferably formed as annular rings and secured to annular flanges 60 and 61 respectively, extending radially from the respective magnetic clutch members 62 and 63. Each of the clutch members 62—63 as indicated in the sectional view in Fig. 11 of the drawings, is provided with a plurality of annular coils of wire 64 located in suitable cavities in the respective clutch members 62 and 63. The coils of wire are preferably protected by annular rings 65 of non-magnetic material forced into mouths of the cavities so as to be flush with the surface of the respective clutch members 62 and 63. The clutch members 62—63 and the respective gears 58 and 59 are preferably rotatably mounted upon a shaft 66 mounted in the enclosing frame or casing 67 of the magnetic clutch controlling device. The shaft 66 is fixedly mounted in its bearings which are formed by providing the casing 67 with inwardly extending bosses 68 and 69 adapted to position the magnetic clutch members 62 and 63. Between the clutch members 62 and 63 and cooperating, respectively therewith, is a pair of armature clutch members 70 and 71 rotating on the shaft 66 and secured to a pinion 72, located between the armature members. Sufficient clearance is left for the independent rotation of the magnetic clutch members 62 and 63 and the armature members 70 and 71. The pinion 72 is adapted to mesh with a gear 73 mounted upon and secured to a shaft 74 mounted in bearings in a housing extending to one side of the enclosing casing 67. The shaft 74 is preferably provided at one end with a universal joint 75—76, by which the shaft 74 is connected with a feed screw 77, threaded through a nut 78 secured to the tracer and cutter bar 3 in any suitable manner as indicated in Fig. 2 of the drawings.

The magnetic clutch members 62 and 63, containing the energizing coils 64 are each provided with contact rings 79 and 80 connected, respectively, with the outer ends of the energizing coils 64, which are preferably connected in series in the usual or any preferred manner. Cooperating with the contact rings 79 and 80 are brushes 81 and 82, one for each ring of each of the magnetic clutches 62 and 63. The brushes 81 and 82 are connected respectively with connection screws 83 and 84 and are adapted to be connected through a suitable relay with the power circuit so that one or the other of the magnetic clutches may be energized, and when so energized will attract the cooperating armature member 70—71, and the latter by driving the pinion 72, will turn the screw 77 for positively feeding the tracer and cutter toward and from the pattern and die.

In order to overcome the inertia of the parts when the clutch members are reversing the direction of rotation of the screw when one clutch member, through the tracer point control, is being deenergized and the other one energized, I preferably provide a friction disc 85, secured against rotation by the cooperation of a lug 86, with oppositely acting springs 87 and 88 extending between lugs 89 and 90 secured to the box or casing 67 of the clutch mechanism as indicated in Figs. 11 and 12 of the drawings. The friction disc 85 is preferably mounted on the end of the shaft 74, previously referred to as carrying the gear 73, and a pair of discs or flanged collars 91 and 92 are mounted upon the end of said shaft and compelled to rotate therewith by suitable keys and a spring 93 is adapted to exert pressure to force the flanged disc 92, which is slidably mounted on the shaft 74, toward the flange of the collar 91. Washers of felt or other suitable material 94 are inserted between the flanges of the collars 91 and 92 and on opposite sides of the disc 85 so that the pressure exerted by the spring 93 is adapted to be exerted through the washers 94 on the friction disc 85 and thus frictionally control any overthrow of the shaft 74 in either direction. Suitable nuts 95 are mounted on the end of the shaft 74 for adjusting the tension of the spring 93. From the construction illustrated it will be seen that the shaft 74 and discs 91—92 are adapted for rotation while the disc 85 remains stationary.

In order to take up back-lash in the feed screw 77 I preferably insert a spring 96 between the bar 3 and a bracket extension 97, mounted upon the slide 5, substantially as indicated in Fig. 2 of the drawings. The thrust of the spring 96 it will be seen is adapted to continuously force the bar 3 outward against the action of the screw 77 and thus take up any lost motion between the threads of the screw and its cooperating nut on the bar 3, and in this manner the tracer and cutter are accurately positioned to follow and reproduce the pattern.

*Safety feed cut-out.*—In a connection with the positive feed of the bar 3, as indicated in Figs. 1, 2 and 19 and 20 of the drawings, I preferably provide means for limiting the extreme feed of the tracer and cutter toward and from the pattern and die by a safety cut-out device comprising a switch plate 98, preferably of insulating material, mounted upon a bracket 99 (see Figs. 2 and 19) which, in turn, is secured to the slide 5 supporting the tracer and cutter bar 3. Mounted upon the plate 98 are two contact carrying members 100 and 101, the member 100, carrying contact point 102, adapted to cooperate with a contact 103, secured to a bracket 104. The bracket is secured to the plate 98, by suitable screws 105, one of which is adapted to be connected with the electrical circuit leading to the clutch controlling the inward feed of the bar 3. The other electrical connection is made under one of the screws 106, adapted to secure the contact member 100 to an angle portion of the plate 98, as indicated in Figs. 19 and 20 of the drawings. The other contact member 101 is provided with a contact point 107 cooperating with a contact 108, projecting from a metal strip or member 109, secured by screws 110 to the supporting plate 98. The contact member 101 is adapted to be moved in the opposite direction from the contact 102 to separate the contact points 107, 108 and this contact member is included in the circuit of the other magnetic clutch which controls the outward feed of the bar 3. The connections being made by suitable wires under one of the screws 110 and another wire under one of the screws 111 by which the member 101 is secured to the supporting plate 98.

Adjustably mounted on the bar 3 are two rods or members 112 and 113 for actuating, respectively the contact members 100 and 101. The rods 112 and 113 are preferably slidably mounted in a bracket 114 secured to the bar 3 in any suitable manner each rod being adapted to be secured in adjusted position by one of the thumb screws 115—116. The inner end of the rod 112 is adapted to contact with the outer end of the contact member 100 and break the contact between the points 102—103 on the inward feed of the bar 3, while the rod 113 is provided with a laterally extending lug or finger 117 adapted to engage the outer end of the contact member 101 and break the contacts 107—108 on the outward movement of the bar 3. By loosening the screws 115—116, and sliding the rods 112—113 the relative throw of the bar 3 may be adjusted and thus provide a safety cut-out adapted to prevent excessive movement of the bar in either direction under the action of the magnetic clutch control and the feed screw 77.

*Diagram of single point control.*—In Fig. 13 of the drawings I show a diagram of the connections between the single point tracer illustrated in Figs. 4, 5, and 6 of the drawings, and referring to this diagram, it will be seen that the contact member 25, by the screw 36 and wire 118 is connected with the battery 119 and through the battery with the relay coil 120 of the relay 121. The other end of the relay coil 120, through the wire 122 is connected with the screw 31, thereby completing the circuit of the battery 119 through the relay by closing the contact points 34 and 35. The armature bar 123 of the relay is provided with two contact points 124 and 125, one of which (124) is adapted to cooperate with a contact 126 on the screw 127, mounted on a bracket 128 of the relay and by means of the wire 129 the contact screw 127 is connected through the safety contact member 100 to one of the connection screws 84 of the clutch controlling the inward feed of the screw, the other screw 83, by the wire 130 is connected with the one side of the lighting or power circuit 131. The other side of the power circuit 132 is, through the wire 133, connected with the armature bar 123, as indicated in Fig. 13.

The contact member 125 on the armature bar 123 is adapted to cooperate with a contact 134 on the screw 135, the latter being connected by the wire 136, through the safety switch contact member 101, with one of the connecting screws 84, cooperating with the clutch adapted for controlling the outward feed of the bar 3. The other connecting screw 83 is connected with one side of the light or power circuit 131. It will thus be seen that when the tracer point 22 is in normal position, pressed forward by the spring 40, and out of contact with the pattern the relay bar 123 is in position to close the circuit through the contact points 124—126 and operate the clutch member 62, controlling the feed of the tracer and cutter, so as to feed the latter axially toward the pattern and die. When the tracer point 22 strikes the pattern, either upon a flat surface or against an angular portion thereof, the tracer point 22 will be moved, either directly inward or angularly as indicated in Fig. 6 of the drawings, a sufficient amount to move the flanged member 15, and the latter, through the rod 24, will move the contact member 25 outward and break the contacts 34—35. When this occurs the battery circuit 118—119—122 is broken through the relay coil 120 and the spring 139 connected with the relay arm 123 will separate the contact 124—126 and close the contacts 125—134 thereby closing the power circuit through the wires 136—137, so as to energize the magnetic clutch member 63, controlling the outward movement feed of the tracer, thereby feeding the latter away from the pattern. In practice, I find that the tracer point 22 can be so proportioned and adjusted, that a minute fractional part of an inch movement thereof will be sufficient to break the contacts 34—35 because it will be observed that the movement of the flanged member 15 is multiplied through the contact carrying member 25, in the present instance the ratio being 2½ to 1, but this may be varied as desired.

In view of the fact that with my improved magnetic control the tracer and cutter are positively fed toward and from the pattern and die, which are supported upon the reciprocating table 10, it is desirable to provide means for protecting the tracer point and cutter against injury. For instance, it may occur that the pattern being followed by the tracer has an abrupt portion much higher than the portion over which the point has been traveling and the feed, operating to move the tracer outward cannot operate fast enough, the table feed would cause the higher portion of the pattern to move the tracer point in excess of the normal movement necessary to break the contacts 34—35 and if the feed were continued would be likely to injure both the tracer and cutter. Therefore, I have provided the contact members 45 and 46 which are adapted to be connected by the wires 140 and 141 to a connecting screw 142 with the magnetic clutch 143 in the usual feeding mechanism for the reciprocating table 10. The other connecting screw 144, by the wire 145, is connected with one side of the power circuit 132, the wire 140 being connected with the other side 131, and it will be seen that, normally the clutch 143 will be energized so that the reciprocation of the table 10, carrying the pattern and die, operates in the usual manner. When for any reason, the tracer point 122 is moved an excess amount, the lug 44 on the upper end of the contact member 25 will strike the lower end of the contact carrying member 43 (see Fig. 4 of the drawings) and break the circuit through the magnetic clutch 143 and immediately stop the feed of the table 10.

*Intermittent table feed.*—Under some circumstances it is desirable to control the feed of the table so that the latter will be fed only at the time the tracer and cutter are in contact, respectively, with the pattern and die. For carrying out this form of control I have illustrated in the diagram of Fig. 14 a second relay 146, the coil 147 of which is connected by the wires 148 and 149, in parallel circuit, with the battery 119 and therefore, is adapted to operate simultaneously with the relay 121. The relay bar 150 of the relay 146 is connected by the wire 151, with the connecting screw 142 of the clutch 143, adapted to control the feed of the table 10, as previously described. The bar 150 is provided with a contact point 152, cooperating with the point 153 on the screw 154, the latter being connected by the wire 155 with the screw 47, the power circuit being completed through the contact member 43 and the wire 140 as indicated in Fig. 14 of the drawings. From this arrangement it will be seen that the moment the contact member 25 is moved outward by movement of the tracer point 22, the circuit of the battery will be broken and the respective armature bars 123 and 150 will be lifted by their respective springs, the relay 121 operating as previously described in connection with the diagram shown in Fig. 13 of the drawings. The release of the relay 150 will close the circuit through the contacts 152—153 so as to energize the clutch 143 and thereby permit feed of the table 10. The feed of the table will continue so long as the circuit through the contact points 152 and 153, is closed but as soon as the tracer point is withdrawn from the pattern, a sufficient amount to permit the bar 25 to close the contacts 34—35, the clutch 143 in the table feed will be deenergized and the feed thereof stopped.

It will be seen that the second relay 143 in Fig. 14 is adapted to control intermittently the vertical feed of the pattern and die with respect to the tracer and cutter. The cut-out switch or circuit through the contact member 43 and the screw 47 is still included in the circuit 150—151—155, through the magnetic clutch 143, so that any excess movement of the tracer point 22 will break the circuit through the magnetic clutch and stop the vertical feed, substantially as described with respect to the diagram of Fig. 13.

In both of the diagrammatic connections shown in Figs. 13 and 14, it will be observed that the limiting cut-out switches 100—101 for limiting the extremes of movement, inward and outward, of the tracer and cutter are indicated as located in the respective circuits of the magnetic clutches 62—63, controlling respectively the feed of the tracer and cutter toward and from the pattern and die. It will be noted that this safety limited control is independent of the control of the clutches by the tracer point.

*Dual-point tracer control.*—In some classes of work it is desirable to control the speed of the vertical feed without interrupting the feed thereof but merely changing from a higher to a lower feed or vice versa. The occasion for using a two-speed control may arise where the surface of the pattern, over which the tracer point is adapted to move, is very irregular and the angles are sharply inclined. For operating on a pattern of this character I prefer to provide a special dual-point tracer for controlling a two-speed magnetic clutch mechanism connected with the vertical table feed. This dual-point tracer is more particularly shown in Figs. 7, 8 and 9 and diagram Fig. 15 of the drawings, in which the corresponding parts of the single point tracer as shown in Fig. 4 are given the same designating characters. In the dual-point tracer it will be seen that the flanged member operated by the disc 19 is provided with a tubular body-portion 156 through which a rod 157 extends. It will also be noted that the tracer point 22ª is provided with a rod 158 passing axially therethrough and provided with a head 159 forming the extreme point of the tracer point 22ª. The head 159 of the rod 158 is adapted for slight movement in an axial direction with respect to the tracer point 22ª. A transversely extending pin 160, at the inner end of the rod 158, is adapted to prevent the latter from dropping out of the tracer point 22ª. The inner end of the headed rod 158 is adapted to rest upon the forward end of the rod 157 and cooperate therewith. The engaging ends of the two rods (157—158) are preferably rounded as indicated so that the tracer point 22ª and the disc 19 may respond to universal movement as described with reference to the form shown in Fig. 4 of the drawings. The rear end of the tubular member 156 is extended, through the plug 23 and the rear face plate 29, by a hollow spindle 161, through which the rod 157 extends. The outer end of the spindle 151 is provided with a shoulder at 162 engaging the contact member 25 which, at this point is provided with a hole through which a reduced portion 163 of the spindle 161 is adapted to pass. A hollow cylindrical extension member 164 is preferably secured to the end 163 of the spindle in any suitable manner as by screw threads, as indicated in the drawings. The member 164 is bored out and the outer end of the rod 157 terminates in the bore, and is provided with a disc head 166 against which a spring 167 is adapted to thrust so as to force the rod 157 and hence the headed rod 158 forward, whereby the head 159 will be held in its extreme outward position. The opposite end of the spring 167 is adapted to thrust against a piston-like plug 168, of insulating material, mounted to slide in a portion of the member 164 which is counter-bored to receive the same. The piston member 168 is preferably provided with a stem 169 which is surrounded by a spring 170, adapted to thrust against the piston 168 and a cap 171 closing the outer end of the cylindrical body 164. The spring 170 is preferably stronger than the spring 167 so that the latter will yield first. The stem 169 and the piston plug 168 is bored out and threaded to receive a screw 172, the inner end of which is provided with a contact point 173 adapted to cooperate with a contact point 174 on the end of the rod 157.

It will thus be seen that when the dual-point tracer strikes the surface of the pattern, as indicated in Fig. 8 of the drawings, the pressure thereof against the pattern will first move the head 159 of the rod 158 and the latter will force the rod 157 rearward so as to bring the contact 173—174 into engagement and close the battery circuit through a relay, controlling the two-speed transverse feed as herinafter described, in connection with the diagram shown in Fig. 15 of the drawings. Continued pressure on the head 159 will move the tracer point 22ª and hence, the disc 19, rearward, the latter forcing the flanged member 156 toward the rear and causing the shoulder 162 thereof to operate the contact member 25 and separate the contacts 34 and 35 as indicated in Fig. 8 of the drawings.

*Two-speed control.*—The dual-point tracer is adapted to control a two-speed clutch mechanism for operating the vertical feed of the table 10, supporting the pattern and die in the type of machine shown in Fig. 1 of the drawings. The plan of the two-speed clutch control mechanism is more particularly indicated in Fig. 3 of the drawings, in which it will be seen that the motor 175, for operating the vertical feed, is connected by gearing 176 with the shaft 177 carrying a gear 178 of comparatively large diameter and a smaller gear or pinion 179 adapted to mesh respectively with a small pinion 180 and a gear 181 rotatably mounted on the shaft 182 which operates the worm screw 183 and wheel 184 which in turn operates the screw 12 for the reciprocating feed of the table 10. This feed mechanism being the usual feed mechanism of this type of machine except that I have inserted the gearing referred to and provided magnetic clutches 185 and 186 cooperating with said gears 180 and 181 to connect one or the other thereof with the shaft 182 so as to give the two-speed feed control. The clutch members 185 are substantially identical in construction with the clutch members 62 and 63 and cooperate with similar armature clutch members 187 and 188, adapted to be secured to the shaft 182. The clutch member 185 being connected to the pinion 180 and the clutch member 186 to the gear 81.

The dual-point tracer and two-speed control will be better understood by examining the electrical connections shown in the diagrammatic view in Fig. 15 of the drawings. It will be seen that the contact screw 172 of the dual-point tracer is connected by a wire 189 with the relay coil 190 of the relay 191, the other end of the relay coil being connected by the wire 192 with the wire 118 so as to be energized by the battery 119, when the contacts 173 and 174 are closed to thereby complete the circuit through the wire 118, connected with the screw 36 in the contact member 25. The armature bar 193 of the relay 191 is provided with two contacts 194 and 195, adapted to cooperate, respectively, with contacts 196 and 197 on the screws 198 and 199. The relay bar 193, by the wire 200, is connected with one side of the power circuit 132, while the screw 198, by wire 201, is adapted to connect the clutch member 186 in the power circuit through the connection screws 202, and the wire 203, which, it will be seen, is connected with the contacts through the screw 47 and from thence through wire 140 to the other side of the power circuit 131. The other contact screw 199 is connected, by the wire 204, with the clutch member 185, through the connection 205 and through the wire 206 to the wire 203 and thence to the other side of the power circuit 131.

The other connections illustrated in the diagram of Fig. 15 are substantially the same as the corresponding connections shown in Figs. 13 and 14 and need no further description. From the diagram of Fig. 15 and Figs. 7, 8 and 9, it will be seen that when the dual-point tracer strikes a flat surface of the pattern, as indicated in Fig. 8, the first operation is to move the head 159 inward with respect to the tracer point 22ª, and close the contact points 173—174 and thus energize the clutch 185 for giving the higher or normal speed of operation to the vertical feed of the pattern and die, relative to the tracer and cutter. When the pressure of the dual-point tracer, against the pattern is sufficient to move the disc 19, the member 25 will be moved as indicated in Fig. 8 and reverse the feed of the tracer and cutter in the manner previously described for the single point tracer. If, however, the surface of the pattern is irregular and the parts at different levels are connected by sharp inclines it is desirable to reduce the speed of the vertical feed, in order to give the tracer point feed mechanism time to withdraw the tracer point and cutter to the higher level of the pattern. Therefore, with my dual-point tracer, if the angle of a portion of the pattern encountered by the tracer point, is greater than 45°, as indicated in Fig. 9 of the drawings, the head 159 will not contact with the pattern and therefore the contact points 173—174 will open and the relay bar 193 will be drawn up by its spring so as to close the contacts 195—196 and energize the magnetic clutch controlling the lower speed feed for the vertical movement of the pattern and die relative to the tracer and cutter. As shown in Fig. 9, however, the contact of the tracer point 22ª with the inclined portion of the pattern will rock the disc 19 and, through the slidable member 156, operate the contact member 25 to control the axial feed of the tracer and cutter, as previously described. As in the control connections previously described, and shown in Figs. 13 and 14, the upper end of the member 25, is adapted to cooperate with the contact member 43 when there is excess movement of the tracer point and thereby cut out the transverse feed entirely and thereby prevent damage to the pattern or to the tracer and cutter.

*Tracer control of slide machine.*—In Figs. 16 and 17 of the drawings, I show my tracer control in connection with a slide form of die sinking machine, particularly adapted for heavy work. In this form of machine the pattern A and die B are mounted in any suitable or preferred manner on the base 207 of the machine and remain stationary during the cutting operation. Extending transversely, in front of the support for the pattern, and die is a slide way 208, with which a slide member 209 cooperates, the slide member 209 being adapted to reciprocate horizontally on the ways 208. A pillar 210 integral with the slide member 209, extends upward therefrom and is provided with vertically disposed slide ways 211, upon which a slide member 212 is adapted to slide. The slide member 212 is preferably balanced by a weight 213, connected therewith by the cable 214, the latter passing over a pulley 215, as indicated in Figs. 16 and 17 of the drawings. Feed of the slide member 212 vertically is controlled by the usual screw and hand wheel 216. The slide member 212 is provided with a forwardly extending shelf 217 adapted, with the face of the member 212, to form a slide way for the slide member 218, which, it will be seen, is adapted to carry the tracer and cutter. The slide member 218 is adapted to be reciprocated on the ways 217 by the screw 219, which corresponds to the screw 77 in the magnetic clutch control mechanism previously described for the bar machine and shown in Figs. 1, 2 and 11.

The screw 219 is operated by a clutch mechanism adapted to be controlled by the tracer points 22—22ª, in the manner previously described for the bar machine. This magnetic clutch mechanism is mounted as indicated in Figs. 16 and 17 on the shelf 217 and the corresponding parts are given the same numbers for identification as the parts in Figs. 10, 11, and 12. This magnetic tracer control operates in the same manner as previously described and no further description is necessary. The tracer point used on this type of machine may be either the single point tracer as illustrated in Fig. 4 of the drawings or the dual-point tracer as shown in Fig. 7 of the drawings. The connections and operation of the two forms of tracers have been illustrated and described in connection with the diagrammatic views in Figs. 13, 14 and 15 and the same diagrams and connections apply to my improved machine shown in Figs. 16 and 17.

In the slide machine the transverse feed between the tracer and cutter and pattern and die is accomplished by lateral movement of the tracer and cutter with respect to the pattern and die, by means of the screw feed 220, adapted for feeding the slide member 209 and the pillar 210 on the way 208.

The feed screw 220 is preferably connected by gears 221 with a reversing clutching mechanism comprising a pair of clutches 222 and 223 connected, respectively, with bevel gears operated by the bevel pinion 224, driven by an electrical motor 225, substantially as indicated in Fig. 17 and diagrammatically in Fig. 18 of the drawings. As will be seen, in Fig. 18, the clutch members 222 and 223 are adapted to be operated by the power circuit, current being taken in on the wires 226 and 227; the wire 227 being connected at 228, to the center of a reversing switch 229. This switch is adapted to direct the current, either through wire 230 to a hand switch 231, or through the wire 232 to an automatic switch 233. The automatic reversing switch 233, is preferably connected to a rod 234 (see Figs. 17 and 18), mounted for reciprocation in brackets 235, secured to the base below the ways 208, as shown in Figs. 16 and 17. A lug 236 projects downward from the slide member 209, and is adapted to cooperate with adjustable collars 237 and 238, on the bar 234, so as to slide the latter, in one direction or the other and thereby operate the switch 233, which, as will be seen in diagram 18, is adapted to reverse the feed by throwing in one or the other of the clutches 222—223. It will be seen that one contact point of the switch 233 is connected by the wire 239 with the connecting screws 240 and thence by the wire 241, with the opposite side 226 of the power circuit. The other contact point of the switch 233 is connected by the wires 242—243 with the connecting screws 244 of the clutch member 223 and thence, by the wire 245, with the other side of the power circuit 226.

When it is desired to operate the clutches 222—223 by the automatic reversing means 236—237—238 the knife switch 229 is thrown over to the left so as to connect in the wire 232 and thus place the switch 233 in circuit. On the other hand, if it is desired to operate the reverse of the feed of the screw 220, by hand, the knife switch 229 is thrown to the right to connect the wire 230 in circuit with the hand switch 231. The contact points of the hand switch are connected respectively, by wires 246 and 247, with the wires 239 and 242 which, it will be seen, control the respective magnetic clutch members 222 and 223.

I believe my tracer control, through magnetic clutches controlling the direct and reverse feed in one or more rectilinear directions, of the tracer and cutter relative to the pattern and die, is radically novel and therefore I wish it understood that I am not limited to the particular forms of tracer shown and described nor to the various control arrangements illustrated, for various modifications of these and their adaptation to various types of machines, may be made without departing from the spirit and scope of our invention. For instance the controlling connections shown in Fig. 14 are adapted for intermittent feed of the table by proper adjustment of the contacts 45—46, so as to break the circuit about the time the circuit is broken at the contacts 34—35 by the member 25.

I claim:—

1. In a die sinking machine, the combination of a tracer and cutter, the tracer being provided with a universally movable point, means for feeding the tracer and cutter relatively to the pattern and work, clutches for controlling said fuel, means for operating one of said clutches when said tracer point is out of contact with the pattern and the other when the point is moved by contact with the pattern, whereby the cutting of the die is automatically controlled by said tracer point.

2. A die sinking machine provided with a tracer and cutter, mounted for movement toward and from the pattern and die, respectively, means for mounting the tracer point for universal movement by and for restoring it to normal after contact with the pattern and means operative by the movement of said point for controlling the movement of the cutter and tracer toward and from the pattern and die.

3. A die sinking machine provided with a tracer and cutter, mounted for movement toward and from the pattern and die, respectively, means for mounting the tracer point for universal movement by contact with the pattern, means for simultaneously feeding the tracer and cutter toward and from the pattern and die and means operative by said tracer point when out of contact and when moved by contact with the pattern for controlling said feeding means in both directions.

4. In a die sinking machine provided with a tracer and cutter, mounted for movement toward and from the pattern and die, respectively, the combination of means for mounting the tracer point for universal movement by contact with the pattern, means for simultaneously feeding the tracer and cutter toward and from the pattern and die, means for relatively feeding the pattern and die past the tracer and cutter respectively, and means operative by said tracer point when moved by contact with the pattern for controlling both of said feeding means.

5. In a die sinking machine provided with a tracer and cutter, mounted for movement toward and from the pattern and die, respectively, the combination of means for mounting the tracer point for universal movement by contact with the pattern, means for simultaneously feeding the tracer and cutter toward and from the pattern and die, clutches controlling said feeding means and means controlled by said universally movable tracer point for operating said clutches.

6. In a die sinking machine provided with a tracer and cutter, mounted for movement toward and from the pattern and die, respectively, the combination of means for mounting the tracer point for universal movement by contact with the pattern, means for simultaneously feeding the tracer and cutter toward and from the pattern and die, means for feeding the pattern and die past the tracer and cutter respectively, clutches controlling said tracer and cutter feeding means, a clutch controlling the second named feeding means and means controlled by said universally movable tracer point for operating said clutches.

7. In a die sinking machine provided with a tracer and cutter, mounted for movement toward and from the pattern and die, respectively, means for mounting the tracer point for universal movement by contact with the pattern, means for positively feeding the tracer and cutter in an axial direction toward and from said pattern and die, respectively, feeding means for causing relative movement between the tracer and cutter and the pattern and die, transversely of said axial movement, a pair of clutches operatively controlled by said tracer point for controlling the axial feed of said tracer and cutter and a clutch operatively controlled by said tracer point for controlling said transverse feed.

8. In a die sinking machine provided with a tracer and cutter, mounted for movement toward and from the pattern and die, respectively, the combination of means for mounting the tracer point for universal movement by contact with the pattern, means for positively feeding the tracer and cutter in axial direction toward and from said pattern and die respectively, feeding means for causing relative feeding movement between the tracer and cutter and the pattern and die, transversely of said axial movement, a pair of clutches operatively controlled by said tracer point for controlling the axial feed of said tracer and cutter, a clutch operatively controlled by said tracer point for controlling said transverse feed and means for cutting out said last named clutch to stop the feed when said tracer point is moved in excess of a predetermined amount.

9. In a die sinking machine the combination with means for supporting a pattern and die, of a member mounted for movement toward and from said support, a tracer and cutter mounted upon said member for movement therewith, means for positively feeding said member toward and from said support, means for moving said support and member relatively, transversely of said toward-and-from feeding movement of said member, means for mounting the tracer point for universal movement by contact with the pattern, a pair of clutches in said feeding means for feeding said member toward and from said support and means operatively controlled by said movable tracer point for operating said clutches.

10. In a die sinking machine, the combination with a tracer and cutter adapted to cooperate respectively with a pattern and die, of means for positively feeding said tracer and cutter toward and from the pattern and die, means for mounting the tracer point for universal movement, by contact with the pattern, electrical contact members controlled by said tracer point, a pair of magnetic clutches cooperating with said feeding means and a relay controlled through said tracer point contact members for throwing in one or the other of said clutches and thereby determining the direction of feed of said tracer and cutter with respect to the pattern and die.

11. In a die sinking machine, the combination with a tracer and cutter, mounted for axial movement toward and from the pattern and die, respectively, of means for positively moving the tracer and cutter toward and from the pattern and die, means for causing relative movement between the tracer and cutter and pattern and die transversely of said axial movement, means for mounting the tracer point for universal movement by contact with the pattern, a pair of magnetic clutches adapted to be energized one at a time to control the axial movement of said tracer and cutter toward and from the pattern and die and means operable by said tracer point for controlling the energizing of said clutches.

12. In a die sinking machine, the combination with a tracer and cutter mounted for axial movement toward and from the pattern and die, respectively, of means for positively moving the tracer and cutter toward and from the pattern and die, means for causing relative movement between the tracer and cutter and pattern and die, transversely of said axial movement, means for mounting the tracer point for universal movement by contact with the pattern, a pair of magnetic clutches adapted to be energized one at a time to control the axial movement of said tracer and cutter toward and from the pattern and die, means operable by said tracer point for controlling the energizing of said clutches, a magnetic clutch in said transverse feeding means and electrical contact members controlled by said tracer point for operating said last named clutch, said means being adapted to stop the transverse feed when said tracer point is moved in excess of a predetermined amount.

13. In a die sinking machine, the combination with a tracer and cutter mounted for movement axially toward and from the pattern and die respectively, of means, including a screw for positively moving said tracer and cutter, gear mechanism for turning said screw, a pair of magnetic clutches cooperating with said gear mechanism for turning said screw in one direction or the other, according to which clutch is energized, means for mounting the tracer point for universal movement by contact with the pattern and die, and electrical means adapted to be controlled by the movement of said tracer point for energizing said clutches, respectively, whereby said screw is adapted to move the tracer and cutter toward and from the pattern and die.

14. In a die sinking machine, the combination with a tracer and cutter mounted for movement axially toward and from the pattern and die respectively, of means including a screw for positively moving said tracer and cutter, a gear mechanism for turning said screw, a pair of magnetic clutches cooperating with said gear mechanism for moving said screw in one direction or the other, according to which clutch is energized, means for mounting the tracer point for universal movement by contact with the pattern, electrical contact members controlled by said movable tracer point and a relay operable through said contact members to determine which of said clutches is to be energized, the tracer thereby controlling the movement of the tracer and cutter toward and from the pattern and die.

15. In a die sinking machine, the combination with a tracer and cutter adapted for axial movement toward and from the pattern and die, respectively, of means for causing relative movement between the tracer and cutter and pattern and die, transversally of said axial movement, said last named means including a magnetic clutch means for mounting the tracer point for universal movement by contact with the pattern, electrical contact members operable by movement of said tracer point for controlling the energization of said magnetic clutch, the adjustment being such that excess movement of the tracer point will release said clutch and stop the transverse feed.

16. In a die sinking machine, the combination with a cutter mounted for axial movement toward and from the die, of means for positively feeding said cutter axially in both directions, a tracer mounted for simultaneous movement with said cutter, said tracer being provided with a tracer point adapted for movement upon contact with the pattern to operatively control the feeding mechanism for said cutter.

17. In a die sinking machine, the combination with a cutter mounted for axial movement toward and from the die, of means including a pair of magnetic clutches, adapted for positively feeding said cutter in an axial direction, means for relatively moving said cutter and die transversely of said axial movement, said last named means including a magnetic clutch, a tracer adapted for cooperating with the pattern, and mounted for simultaneous movement with said cutter, means whereby the tracer point is adapted to control the operation of said clutches, thereby controlling the axial feed of said cutter and said relative transverse feed.

18. In a die sinking machine, the combination with a tracer and cutter, mounted for axial movement toward and from the pattern and die, of feeding means for producing relative movement between said tracer and cutter and the pattern and die, transversely of said axial movement, said means including a pair of clutches and gearing cooperating therewith for giving two speeds for said feeding mechanism, means for mounting the tracer point whereby movement thereof by contact with the pattern is adapted to control the operation of said clutches, and to thereby vary said transverse feed.

19. In a die sinking machine, the combination with a tracer and cutter mounted for axial movement toward and from the pattern and die, of a screw adapted for positively feeding said tracer and cutter axially toward and from the pattern and die, power driven gear mechanism for operating said screw, said gear mechanism including a pair of bevel gears turning in opposite directions, a magnetic clutch member mounted on each of said bevel gears, cooperating clutch members connected by intermediate gearing with said screw, the arrangement being such that the energizing of the respective magnetic clutches will turn said screw in opposite directions, and means for mounting the point of said tracer for movement by contact with the pattern, the movement of said tracer point being adapted to electrically control the throwing in of said clutches, one at a time, and thereby control the direction of feed of said tracer and cutter.

20. In a die sinking machine, the combination with a tracer and cutter, mounted for axial movement toward and from the pattern and die, of means for positively feeding said tracer and cutter in an axial direction toward and from the pattern and die, said means including a screw and reversing gearing connections therefor, a pair of magnetic clutches cooperating with said gearing for turning the screw in one direction or the other, feeding means for moving the tracer and cutter and pattern and die relatively, transversely of said axial movement, said last named feeding means including a pair of magnetic clutches and gearing cooperating therewith for giving two speeds of transverse feed, means for mounting said tracer point for lateral and axial movement by contact with the pattern, said movement adapting the tracer point for controlling the energization of said first named clutches for controlling the axial feed of the tracer and cutter and an independently movable head on said tracer point adapted by its movement in an axial direction to control through electrical connections said two-speed clutches, the arrangement being such that when said head is pressed back by contact with the pattern the clutch giving the faster speed will be in operation and when said head is not under pressure, the clutch giving the slower speed will be operative.

21. In a die sinking machine, the combination with a tracer and cutter, mounted for axial movement toward and from the pattern and die, of feeding means for relatively moving the tracer and cutter and pattern and die, transversely of said axial movement, said feeding means including a screw and a two-speed gearing connection for operating said screw, a pair of magnetic clutches cooperating with said gearing, one for each speed, means for mounting the head of said tracer for movement by contact with the pattern, electrical connections, whereby said tracer head is adapted to control the energization of said clutches, the arrangement being such that when said tracer head is out of contact with the pattern the lower speed clutch will be in operation and when in contact with the pattern, the higher speed clutch will be in operation.

22. In a die sinking machine, the combination with a tracer and cutter mounted for movement in unison, of means for positively feeding the tracer and cutter, in an axial direction, toward and from the pattern and die, respectively, a pair of magnetic clutches controlling said axial feed, one of said clutches being operative for each direction of feed, feeding mechanism for relatively moving said tracer and cutter and the pattern and die, transversely of said axial feed, a magnetic clutch adapted for controlling said transverse feed for starting and stopping the same, means for mounting the tracer point for movement by contact with the pattern, such movement being adapted through electrical connections to control said first named clutches, said connections being so arranged that when the tracer point is out of contact with the pattern, one of the first named clutches will be operative for said axial feed toward the pattern and die, and upon movement by pressure of the tracer point against the pattern, the other of said pair of clutches will be operative and the axial feed will be reversed and means, simultaneously operative when the tracer point feed is thus reversed for closing said last named clutch for the transverse feed.

23. In a die sinking machine, the combination with a tracer and cutter adapted for axial movement toward and from the pattern and die, of means for positively feeding said tracer and cutter in an axial direction, said means including a pair of magnetic clutches, one of which is adapted to be energized for feeding the tracer and cutter in each direction, electrical connections for controlling said clutches from said tracer and a pair of adjustable safety switches or cut-out members, mounted for movement with said tracer and cutter, adapted to cut out the respective clutches independently of said tracer point, and thereby limit the movement of the tracer and cutter in either direction.

24. In a die sinking machine, the combination with a cutter and tracer mounted for axial movement toward and from the pattern and die, of means for positively feeding said tracer and cutter in an axial direction, said means including a pair of magnetic clutches, one for each direction of feed, means for mounting the tracer point for independent movement by contact with the pattern, electrical connections controlled by the movement of said tracer point for energizing one or the other of said clutches, said electrical connections including a pair of safety contact switches and a pair of adjustable switch operating members mounted for relative movement with said tracer and cutter, said members being so adjusted as to break the respective contact of said switch and thereby limit the movement of said tracer and cutter toward and from the pattern and die to a predetermined amount in each direction and thereby prevent injury to the mechanism.

25. In a die sinking machine, the combination with a tracer and cutter mounted for axial movement toward and from the pattern and die, of a screw for positively feeding said tracer and cutter in an axial direction, gear mechanism for operating said screw in both directions and a spring for moving the tracer and cutter in one direction as the screw is operated to feed in the corresponding direction, thereby giving accurate positive feed in both directions.

26. In a die sinking machine, the combination with a tracer and cutter mounted for axial movement toward and from the pattern and die, of a screw for positively feeding said tracer and cutter in an axial direction, gear mechanism for operating said screw in both directions, a pair of magnetic clutches cooperating with said gear mechanism, one clutch being operative for each direction of feed, and a resiliently mounted friction member for preventing overthrow in said screw feed gear mechanism, when the feed is reversed by said clutches.

27. In a die sinking machine, in which a tracer and cutter cooperate respectively, with the pattern and die, the combination of a tracer comprising a body portion, a disc mounted in one end of said body portion, said disc being adapted for angular and longitudinal movement relative to its axis, a tracer point mounted on said disc axially thereof, and adapted by contact with the pattern to move said disc, a member provided with a circular flange adapted to contact with said disc, said flange member being mounted to slide in said body portion and an electrical contact closing member adapted to be operated by said flanged member when it is moved.

28. In a die sinking machine, in which a tracer and cutter cooperates respectively, with the pattern and die, the combination of a tracer comprising a cylindrical body portion, a disc mounted in one end of said body portion, said disc being adapted for angular and longitudinal movement relative to the axis of said member, a tracer point mounted on said disc, axially thereof and adapted by contact with the pattern to move said disc, a member provided with a circular flange adapted to contact with said disc, said flange member being mounted to slide in said body portion, a contact member adapted to be moved by said flanged member when said point is moved, and a second contact member adapted to be operated by excess movement of said disc and flanged member.

29. In a die sinking machine, in which a tracer and cutter cooperate respectively with the pattern and die, a tracer comprising a cylindrical body portion, a disc mounted in one end of said body portion, said disc being adapted for angular and longitudinal movement relative to the axis of said body portion, a dual tracer point mounted centrally of said disc and adapted by contact with the pattern to move said disc angularly and longitudinally, a flanged member for longitudinal movement in said body portion, the flange thereof being adapted to cooperate with said disc so that movement of the latter may be transmitted to said flanged member, electrical contact members supported on the opposite end of said body portion and adapted to be operated by said flanged member, a separate slidable rod mounted axially of said dual tracer point, said rod being provided with a head adapted to form the pointed end of said tracer and movable relative thereto in an axial direction independently of said disc, said rod cooperating with a second rod extending axially of said flanged member, and electrical contacts controlled by said rod, said contacts being adapted to be closed when the head of said tracer rod is forced inward relative to said disc by contact with the pattern.

30. In a die sinking machine, the combination with a tracer and cutter, of a member upon which said tracer and cutter are mounted, means for positively feeding said member and the tracer and cutter toward and from the pattern and die, gear mechanism for operating said feed, a magnetic clutch cooperating with said gear mechanism for feeding said member in each direction and means rendering the point of said tracer movable whereby said point by its movement is adapted to control the feed of said member by the energization of one of said clutches, the arrangement being such that when said point is moved by contact with the pattern the feed will be reversed so as to move the tracer and cutter away from the pattern and die respectively.

31. In a die sinking machine, the combination with a tracer and cutter, of a member upon which said tracer and cutter are mounted, means for positively feeding said member so as to move the tracer and cutter along perpendicular lines toward and from the pattern and die respectively, gear mechanism for operating said feed, clutches cooperating with said gear mechanism for feeding said member in each direction, means rendering the point of said tracer movable whereby said point by movement thereof is adapted to control the feed of said member, by controlling effective operation of one of said clutches, the arrangement being such that normally the feed is toward, but when said point is moved by contact with the pattern the feed will be reversed so as to move the tracer and cutter away from the pattern and die, means for relatively feeding the tracer and cutter and pattern and die, transversely of said first named feed, gear and clutch mechanism for operating said last named feed in one direction or the other, and means whereby said tracer point is adapted to control the transverse feed by controlling the operation of said clutch mechanism.

32. In a die sinking machine, the combination with a tracer and cutter, of a member upon which said tracer and cutter are mounted, means for positively feeding said member so as to move the tracer and cutter along perpendicular lines toward and from the pattern and die, respectively, gear mechanism for operating said feed, clutches cooperating with said gear mechanism for feeding said member in each direction, means rendering the point of said tracer movable, whereby said point is adapted by the movement thereof to control the feed of said member, by controlling effective operation of one of said clutches, the arrangement being such that normally the feed is toward, but when said point is moved by contact with the pattern the feed will be reversed so as to move the tracer and cutter away from the pattern and die, means for relatively feeding the tracer and cutter and pattern and die, transversely of said first named feed, gear and clutch mechanism for operating said last named feed in one direction or the other, means whereby said tracer point is adapted to control the transverse feed by controlling the operation of said clutch mechanism, and means operable by said transverse feeding means for operating said clutch mechanism and reversing the feed at predetermined limits of transverse feed.

33. In a die sinking machine, the combination of a tracer and cutter, movable relative to the pattern and die in the three directions of rectilinear coordinates, feeding means for effecting movement in each of the three directions and a pair of magnetic clutches adapted to be operated by said tracer to control direct and reverse feed in one of said rectilinear directions, substantially as shown and described.

34. In a machine for duplicating work from a pattern, the combination of a tracer and cutter cooperating respectively with the pattern and work, said tracer being provided with a body portion, a universally movable tracer point carrying member mounted in said body portion, electrical contacts adapted to be controlled by the position of said tracer point member with respect to the body portion, certain of said contacts being closed when said tracer point is in normal position and out of contact with the pattern and other of said contacts being closed by movement of the tracer point relative to said body portion by contact with the pattern, means for effecting feed of the tracer and cutter relative to the pattern and work, and clutches operated by the closing of said contacts for controlling said feed.

35. In a machine for duplicating work from a pattern, the combination with a cutter cooperating with the work, of a tracer provided with a body portion and a universally movable tracer point for cooperation with the pattern, means controlled by the tracer point when in normal position out of contact with the pattern, for positively feeding the tracer and cutter toward the pattern and work respectively, and means controlled by said tracer point when moved out of normal position by contact with the pattern for positively feeding the tracer and cutter away from the pattern and work respectively.

36. In a machine for duplicating work from a pattern, the combination with a tracer and cutter, of means for positively feeding the tracer and cutter toward and from the pattern and work respectively, a tracer point member mounted for universal movement, a plurality of circuit closing contacts controlled by said tracer point member, means for holding certain of said contacts in closed relation when said tracer point member is in normal position, other of said contact members, being adapted to be closed by movement of said tracer point member out of normal position when the tracer point engages the pattern, and electro-magnetic clutches in the circuits controlled by said contacts for operating said feeding means.

37. In a machine of the character described, the combination with a tracer and cutter, of a screw for positively feeding the tracer and cutter toward and from the pattern and die respectively, a pair of electro-magnetic clutches controlling the feed of said screw, a tracer point member adapted when in normal position and out of contact with the pattern to render one of said clutches active to effect feed by said screw of the tracer and cutter toward the pattern and die, and means effective by a movement of said tracer point member upon engagement of the point with the pattern for throwing out said active clutch and operating the other clutch for effecting feed by said screw of the tracer and cutter away from the pattern and die.

38. In a machine of the character described, the combination with a cutter for executing the work, of a movable tracer point for controlling the relative feed between the cutter and the work, means under the control of said tracer point when in normal position for operating said feed to bring the cutter and the work closer together, and means controlled by the movement of said tracer point out of normal position for reversing said feed and moving the cutter and work away from each other.

39. In a machine for duplicating work from a pattern, the combination with a tracer and cutter, of means for positively feeding the tracer and cutter toward and from the pattern and work respectively, and means for automatically controlling the feed in each direction.

40. In a machine for duplicating work from a pattern, the combination with a tracer and cutter, of a support for the tracer and cutter. whereby they may be simultaneously moved toward and from the pattern and die respectively, positive feeding means for said support, for moving the tracer and cutter toward and from the pattern and work respectively and means controlled by said tracer for automatically operating said feeds.

41. In a machine for duplicating work from a pattern, the combination with a tracer and cutter, of means for positively feeding the tracer and cutter toward and from the pattern and die respectively, and magnetic clutches operative to effect said toward and from feeds respectively.

42. In a machine for duplicating work from a pattern, the combination with a tracer and cutter, of a screw for postively feeding the tracer and cutter toward and from the pattern and die respectively, and means for automatically controlling the feed of said screw.

43. In a machine for duplicating work from a pattern, the combination of a member mounted for feeding movement, a screw cooperating with said member for direct and reverse feed thereof, a pair of magnetic clutches for operating said screw for the direct and reverse feed, and means controlled by the movement of said member for automatically operating said clutches.

JOHN C. SHAW.